(12) United States Patent
Norton

(10) Patent No.: US 12,480,859 B2
(45) Date of Patent: Nov. 25, 2025

(54) METHODS AND SYSTEMS FOR EVALUATING FLOW CYTOMETER DATA FOR THE PRESENCE OF A COINCIDENT EVENT

(71) Applicant: Becton, Dickinson and Company, Franklin Lakes, NJ (US)

(72) Inventor: Pierce O. Norton, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 400 days.

(21) Appl. No.: 18/095,130

(22) Filed: Jan. 10, 2023

(65) Prior Publication Data
US 2023/0266228 A1    Aug. 24, 2023

Related U.S. Application Data

(60) Provisional application No. 63/313,391, filed on Feb. 24, 2022.

(51) Int. Cl.
| | | |
|---|---|---|
| G01N 15/1434 | (2024.01) | |
| G01N 15/01 | (2024.01) | |
| G01N 15/10 | (2024.01) | |

(52) U.S. Cl.
CPC ......... *G01N 15/1436* (2013.01); *G01N 15/01* (2024.01); *G01N 2015/1006* (2013.01)

(58) Field of Classification Search
CPC ...... G01N 15/14; G01N 33/483; G01N 15/10; G16B 40/10; G16B 50/00
See application file for complete search history.

(56) References Cited

U.S. PATENT DOCUMENTS

| | | | | |
|---|---|---|---|---|
| 5,880,474 | A * | 3/1999 | Norton | G01N 15/1429 250/459.1 |
| 2008/0213915 | A1* | 9/2008 | Durack | G01N 15/1459 436/172 |
| 2010/0090677 | A1* | 4/2010 | Britton | G01N 15/1429 356/337 |
| 2012/0312085 | A1* | 12/2012 | Schilffarth | G01N 15/1012 73/61.73 |

(Continued)

*Primary Examiner* — Uzma Alam
*Assistant Examiner* — Justin J Van Cleave
(74) *Attorney, Agent, or Firm* — Bret E. Field; BOZICEVIC, FIELD & FRANCIS LLP

(57) ABSTRACT

Methods for evaluating flow cytometer data for the presence of a coincident event are provided. Methods of interest include receiving flow cytometer data associated with a first particle, where the received flow cytometer data is obtained from a detector following the irradiation of the first particle and a second particle in a flow stream by first and second light sources, respectively. Methods also include receiving first and second trigger signals associated with the first and second particles, respectively. In addition, the subject methods include generating a time interval for the first and second particles based on a difference between the first and second trigger signals, and evaluating the flow cytometer data for the presence of a coincident event based on the generated time interval by determining if the first and second particles are irradiated by the first and second light sources simultaneously. Systems and computer-readable media are also provided.

19 Claims, 8 Drawing Sheets

(56) References Cited

U.S. PATENT DOCUMENTS

| | | | |
|---|---|---|---|
| 2014/0268102 A1* | 9/2014 | Shah | G01N 33/4915 |
| | | | 702/21 |
| 2015/0253235 A1* | 9/2015 | Kaduchak | G01N 15/1404 |
| | | | 702/89 |
| 2018/0366570 A1 | 12/2018 | Knox et al. | |
| 2019/0094122 A1* | 3/2019 | Smolak | G01N 15/1459 |
| 2021/0251491 A1 | 8/2021 | Zharov | |
| 2021/0404938 A1 | 12/2021 | Osborne et al. | |
| 2022/0057317 A1* | 2/2022 | Yamamoto | G01J 3/0286 |

* cited by examiner

METHODS AND SYSTEMS FOR EVALUATING FLOW CYTOMETER DATA FOR THE PRESENCE OF A COINCIDENT EVENT

CROSS-REFERENCE TO RELATED APPLICATIONS

Pursuant to 35 U.S.C. § 119 (e), this application claims priority to the filing dates of U.S. Provisional Patent Application Ser. No. 63/313,391 filed Feb. 24, 2022, the disclosure of which application is incorporated herein by reference in their entirety.

INTRODUCTION

The characterization of analytes in biological fluids has become an important part of biological research, medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary and may include one or more broad spectrum lamps, light emitting diodes as well as single wavelength lasers. The light source is aligned with the flow stream and an optical response from the illuminated particles is collected and quantified.

In spatially-separated, multi-laser flow cytometry systems, there are apertures arranged to collect fluorescent emissions from cells as they pass through each laser beam in the system. The emissions collected through these apertures are typically directed to individual detector arrays, one per laser beam. Because the laser beams are spatially separated from each other and the apertures nominally block the fluorescent light emitted from cells travelling through non-primary lasers, it has generally been assumed that any crosstalk between lasers and detectors exists within acceptable levels. Current systems do not address the issue of crosstalk and rely on the relatively low frequency of it occurring as well as the generally low magnitude of the crosstalk when it occurs.

SUMMARY

The present inventors has realized that, even though the possibility of crosstalk between lasers and detectors has previously been an acceptable deficiency, the growing trend towards including more colors in flow cytometric protocols is stressing systems to the degree that the noise created by this crosstalk can decrease the fidelity of the resulting data and potentially create confounding artifacts. Furthermore, as flow cytometers evolve and speed requirements increase, the occurrence of coincidence becomes more likely. As such, it is desirable to at least identify crosstalk situations where the data may be considered suspect. Embodiments of the invention satisfy this desire.

Aspects of the invention include methods of evaluating flow cytometer data for the presence of a coincident event. Methods of interest include receiving flow cytometer data associated with a first particle, where the flow cytometer data is obtained from a detector following the irradiation of the first particle and a second particle in a flow stream by first and second light sources, respectively. Methods also involve receiving first and second trigger signals associated with the first and second particles, respectively. Methods additionally include generating a time interval for the first and second particles based on a difference between the first and second trigger signals, and evaluating the flow cytometer data for the presence of a coincident event based on the generated time interval by determining if the first and second particles are irradiated by the first and second light sources simultaneously. The first and second trigger signals indicate, in embodiments, time points at which the first and second particles are detected in the flow stream, respectively, and may be used to estimate the relative positions of the first and second particles within the flow stream. In some embodiments, evaluating the flow cytometer data comprises comparing the generated time interval to a measurement window associated with the second light source, e.g., where the measurement window defines a period of time during which the irradiation of the second particle produces a coincident event. Evaluating the flow cytometer data may, in some such embodiments, include determining based on the time interval if the second particle falls within the measurement window of the second light source while flow cytometer data associated with the first particle is obtained from the detector. In other cases, evaluating the flow cytometer data comprises comparing the time interval to a standard value, such as determining if the time interval is lower than the standard value.

Following the evaluation of the flow cytometer data, methods may additionally include modifying flow cytometer data resulting from a coincident event. For example, in some embodiments, methods include assigning a coincidence identifier to the flow cytometer data comprising a coincident event. In additional instances, methods include disregarding the flow cytometer data comprising a coincident event. In certain cases, the method is repeated with respect to different pairs of first and second particles. In other words, methods include evaluating flow cytometer data associated with a plurality of different pairs of first and second particles from within a particulate sample. In some instances, the first and second particles are consecutive particles within the flow stream. In other instances, the first and second particles are non-consecutive particles within the flow stream.

Flow cytometer data evaluated in the present methods may be received from a previously-conducted experiment (i.e., from storage/memory) or received in real-time from a flow cytometric experiment. Where the flow cytometer data is received in real-time, methods may additionally include irradiating the first and second particles in a flow stream with first and second light sources, respectively. If and when a coincident event is detected with respect to the first and second particles, embodiments of the subject methods include deactivating the second light source during the coincident event. In certain cases, the first and second light sources are selected from a plurality of light sources (e.g., from 2 to 10 different light sources). The plurality of light sources may include, for example, one or more lasers. Similarly, in some cases, the detector is selected from a plurality of detectors (e.g., from 2 to 10 different detectors). The plurality of detectors may include, for example, one or more detector arrays.

Aspects of the invention also include systems. Systems of interest include, a flow cell configured to transport a particulate sample in a flow stream, first and second light sources configured to irradiate first and second particles in the particulate sample, respectively, a detector configured to produce flow cytometer data associated with the first particle, and a processor. The subject processors are configured to perform the subject methods (e.g., as described above) and receive flow cytometer data associated with the irradiated first particle from the detector as well as first and second trigger signals associated with the first and second particles, respectively. In addition, the processors are configured to generate a time interval for the first and second particles based on a difference between the first and second trigger signals and evaluate the obtained flow cytometer data for the presence of a coincident event based on the generated time interval by determining if the first and second particles are irradiated by the first and second light sources simultaneously. In some cases, the subject systems include a plurality of light sources (e.g., from 2 to 10 different light sources), and the first and second light sources are selected from the plurality of light sources. The plurality of light sources may include, for example, one or more lasers. In additional cases, systems include a plurality of detectors (e.g., from 2 to 10 different detectors), and the detector is selected from the plurality of detectors. In certain cases, the system is a flow cytometer. The system may, in some embodiments, further include a display configured to output the flow cytometer data evaluated by the processor.

Aspects of the invention additionally include non-transitory computer readable storage media comprising instructions stored thereon for evaluating flow cytometer data for the presence of a coincident event using the subject methods. In particular, the subject non-transitory computer readable storage medium includes instructions for receiving flow cytometer data associated with a first particle, where the flow cytometer data is obtained from a detector following the irradiation of the first particle and a second particle in a flow stream by first and second light sources, respectively, as well as first and second trigger signals associated with the first and second particles, respectively. Non-transitory computer readable storage media of interest additionally include instructions for generating a time interval for the first and second particles based on a difference between the first and second trigger signals, and evaluating the flow cytometer data for the presence of a coincident event based on the generated time interval by determining if the first and second particles are irradiated by the first and second light sources simultaneously.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1A:
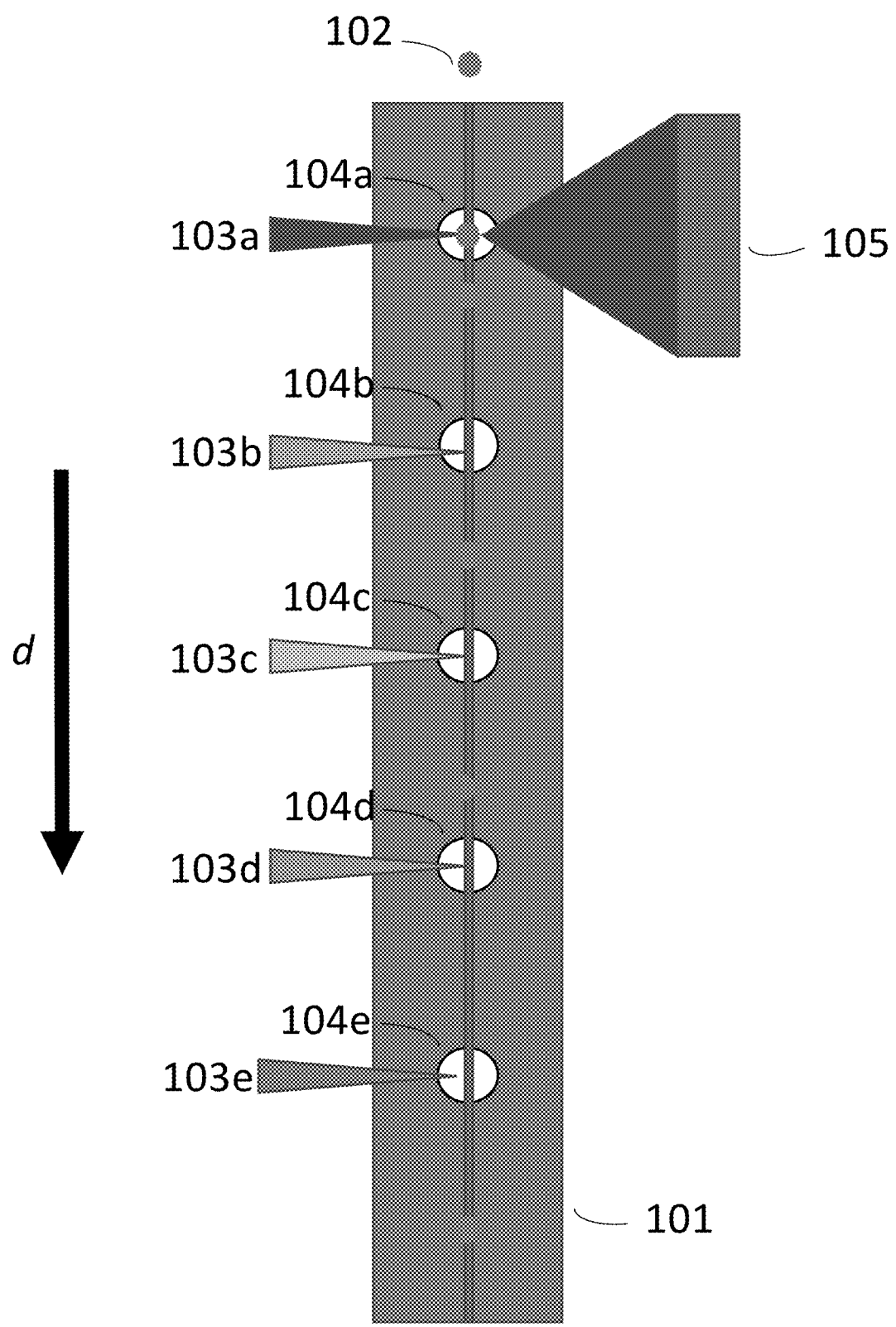
FIG. 1A-B contrasts a flow cytometric scenario that that involves crosstalk (FIG. 1B) with a flow cytometric scenario that does not involve crosstalk (FIG. 1A).

Methods for evaluating flow cytometer data for the presence of a coincident event are provided. Methods of interest include receiving flow cytometer data associated with a first particle, where the received flow cytometer data is obtained from a detector following the irradiation of the first particle and a second particle in a flow stream by first and second light sources, respectively. Methods also include receiving first and second trigger signals associated with the first and second particles, respectively. In addition, the subject methods include generating a time interval for the first and second particles based on a difference between the first and second trigger signals, and evaluating the flow cytometer data for the presence of a coincident event based on the generated time interval by determining if the first and second particles are irradiated by the first and second light sources simultaneously. Systems and computer-readable media are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods of Evaluating Flow Cytometer Data

As discussed above, aspects of the invention include a method of evaluating flow cytometer data for the presence of a coincident event. As discussed herein, a "coincident event" refers to flow cytometric biological event data obtained from flow cytometric protocol in which light is collected by a detector from a first particle irradiated by a first light source while a second light source is irradiating a second particle. In other words, a coincident event is present in flow cytometer data if first and second particles are irradiated by the first and second light sources simultaneously. As discussed in the Introduction section, light emitted from cells travelling through non-primary lasers may be collected by a detector associated with the primary laser. This results in "crosstalk" that can potentially compromise data. "Primary" and "non-primary" designations may refer to a correspondence between a given light source and the particle that it is irradiating. In an instance where a particle passes through a beam of light emitted by a first light source while a second light source is active, the first light source is designated as the primary light source with respect to that particle while the second light source is the non-primary light source with respect to the same particle. In certain cases, evaluating flow cytometer data for the presence of a coincident event improves the quality of the flow cytometer data, e.g., by permitting the identification and/or removal of flow cytometer data that are potentially suspect and may comprise artifacts.

Methods of interest include receiving flow cytometer data associated with a first particle. The subject flow cytometer data is obtained from a detector following the irradiation of the first particle and a second particle in a flow stream by first and second light sources, respectively. The subject detector may be any convenient detector configured to collect light from an irradiated particle in a flow stream. Detectors of interest may include, but are not limited to, optical sensors or detectors, such as active-pixel sensors (APSs), avalanche photodiodes (APDs), image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In some embodiments the detector is selected from a plurality of detectors. In other words, a given flow cytometer from which the subject flow cytometer data is received may include a plurality of detectors, and the detector of interest to the subject method may be selected from any one of these detectors. The number of detectors in the plurality of detectors may range from, e.g., 2 to 20, such as 2 to 10. In certain cases, the detectors in the plurality of detectors are fluorescent light detectors. Each detector in the plurality of detectors may be of any suitable type, including, but not limited to, those listed above.

In some embodiments, the plurality of detectors includes one or more detector arrays, such as an array of photodiodes. In these embodiments, each detector array may include 4 or more detectors, such as 10 or more detectors, such as 25 or more detectors, such as 50 or more detectors, such as 100 or more detectors, such as 250 or more detectors, such as 500 or more detectors, such as 750 or more detectors and including 1000 or more detectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The detectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The detectors in the detector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The detector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the detector array has a rectangular-shaped active surface.

In addition, the first and second light sources used to irradiate the first and second particles may independently be any convenient light source configured to irradiate a particle in a flow stream. For example, In some embodiments, one or more of the first and second light sources is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof. In some cases, the first and second light sources are selected from a plurality of light sources. In other words, a given flow cytometer from which the subject flow cytometer data is received may include a plurality of light sources, and the first and second light sources of interest to the subject method may be selected from any two of these light sources. The number of light sources in the plurality of light sources may range from, e.g., 2 to 20, such as 2 to 10. The light sources (e.g., lasers) in the plurality of light sources may be of any convenient type, including, but not limited to, those described above.

Aspects of the invention additionally include receiving first and second trigger signals associated with the first and second particles, respectively. By "trigger signal" it is meant a time point at which a given particle is first detected in the flow stream. As such, in some cases, the first and second trigger signals indicate time points at which the first and second particles are detected in the flow stream, respectively. The subject trigger signal may be received from any suitable detector in a flow cytometer. For example, in some cases, the trigger signal is received from a forward-scattered light detector. In additional embodiments, the trigger signal is received from a side-scattered light detector. In still additional embodiments, the trigger signal is received from an axial-light loss (ALL) detector. In further embodiments, the trigger signal is received from a fluorescent light detector. Embodiments of the invention include receiving a trigger signal for each particle in the flow stream. In some embodiments, each trigger signal may be employed to provide an approximation of the particle's location in the flow stream at any point during its transit. In these embodiments, the particle's location may be approximated using the trigger signal and the flow rate of the flow stream.

After the flow cytometer data and the first and second trigger signals are received, aspects of the subject method include generating a time interval for the first and second particles based on a difference between the first and second trigger signals. For example, where $t_1$ is the time point associated with the first trigger signal and $t_2$ the time point associated with the second trigger signal, the time interval may be calculated by finding $|t_2-t_1|$. In some cases, the time interval indicates an amount of time elapsing between the time point at which the first particle is detected in the flow stream (i.e., the first trigger signal) and the time point at which the second particle is detected in the flow stream (i.e., the second trigger signal). In certain instances, the generated time interval provides an approximation of the relative positions of the first and second particles within the flow stream. In other words, assuming a constant flow rate, the generated time interval will correspond to a particular (e.g., constant) distance measured with respect to the flow axis that separates the first and second particles as those particles are transported.

Following the generation of the time interval, methods of interest additionally include evaluating the flow cytometer data for the presence of a coincident event based on the generated time interval. In other words, methods include determining if the first and second particles are irradiated by the first and second light sources simultaneously. Any convenient method for determining the presence of a coincident event may be applied. In certain cases, evaluating the flow cytometer data comprises comparing the time interval to a measurement window associated with the second light source. By "measurement window" it is meant a period of time during which the irradiation of the second particle by the second light source produces a coincident event. Put another way, a second particle that is estimated to be within an interrogation zone of the second light source based on the generated time interval during the irradiation of the first particle by the first light source is said to be within the measurement window associated with the second light source. As discussed herein, an "interrogation zone" refers to a region within the flow stream in which a particle is irradiated by light from a light source, e.g., for analysis. The size of the interrogation zone may vary as desired. For example, where 0 µm represents the axis of light emitted by the light relevant light source, the interrogation zone may range from −100 µm to 100 µm, such as −50 µm to 50 µm, such as −25 µm to 40 µm, and including −15 µm to 30 µm. According to these embodiments, therefore, evaluating the flow cytometer data comprises determining based on the time interval if the second particle falls within the measurement window of the second light source while flow cytometer data associated with the first particle is obtained from the detector. Because the time interval is related to a distance separating first and second particles as they travel through the flow stream (i.e., as discussed above), it can be determined whether first and second particles being separated by such a distance would simultaneously exist within the interrogation zones of the first and second light sources at some point during their transit in the flow stream, i.e., as opposed to particles associated with a larger or smaller time interval that cannot exist within the interrogation zones of the first and second light sources simultaneously. In some embodiments, methods include determining whether the generated time interval exists within a range of time values associated with the measurement window. If the time interval exists within the range of time values associated with the measurement window, it may be determined that the resulting flow cytometer data includes a coincident event. If the time interval does not within a range of time values associated with the measurement window (i.e., it is higher or lower than the range), it may be determined that the resulting flow cytometer data does not include a coincident event.

In other cases, evaluating the flow cytometer data comprises comparing the time interval to a standard value. As discussed above, only particles separated by a certain distance within the flow stream may be irradiated by the first and second light sources simultaneously. One way to identify coincident events, therefore, would be to consider particles having a separating distance (i.e., as determined by the time interval) that is smaller than a standard value as potentially contributing to crosstalk. Put another way, in these embodiments, evaluating the flow cytometer data comprises determining if the time interval is lower than the standard value. In certain instances, the standard value is a length of time. If the time interval is lower than the length of time associated with the standard value, it may be determined that the resulting flow cytometer data is associated with a coincident event. In some embodiments, the subject standard value is employed where it is desirable to be more conservative in the evaluation of flow cytometer data for coincident events, i.e., by designating flow cytometer data that could possibly involve a coincidence as including a coincident event.

In addition, embodiments of the method include evaluating flow cytometer data associated with a plurality of different pairs of first and second particles from within a particulate sample. In other words, the method is repeated such that different particles are designated as the first and second particles. In some embodiments, a particle that was once the first particle in an earlier iteration of the method may subsequently be considered the second particle, and so on. In certain cases, the method is repeated such that every particle in the particulate sample being analyzed is designated as the first and/or second particle at least once. The detector as well as the first and second light sources may be the same or different among the iterations of the method. For example, different sets of light sources within a plurality of light sources may be designated the first and second light sources of interest to the method in separate iterations. Similarly, different detectors within a plurality of detectors may be designated as the detector of interest to the method in separate iterations. In some cases where it is determined with respect to a particular combination of light sources and detector that flow cytometer data associated with a given set of first and second particles includes a coincident event, it may be extrapolated that flow cytometer data received from this particular first particle by one or more additional detectors (i.e., as the particle progresses in the flow stream) also includes a coincident event. Given that the flow rate does not change, it can be assumed that the distance separating the first and second particles remains the same as the particles progress through the flow cell. Therefore, first and second particles associated with a time interval that, e.g., has been found to be within a measurement window or is below a standard value may continue to produce flow cytometer data having coincident events as they are measured by other light sources and detectors. Therefore, flow cytometer data measured from this particle at each detector may similarly include coincident events. The first and second particles may or may not be consecutive particles in the flow stream. In certain cases, the first and second particles are consecutive particles within the flow stream (i.e., have no particles separating them). In other cases, the first and second particles are non-consecutive particles within the flow stream (i.e., have one or more particles separating them).

Figure 1B:
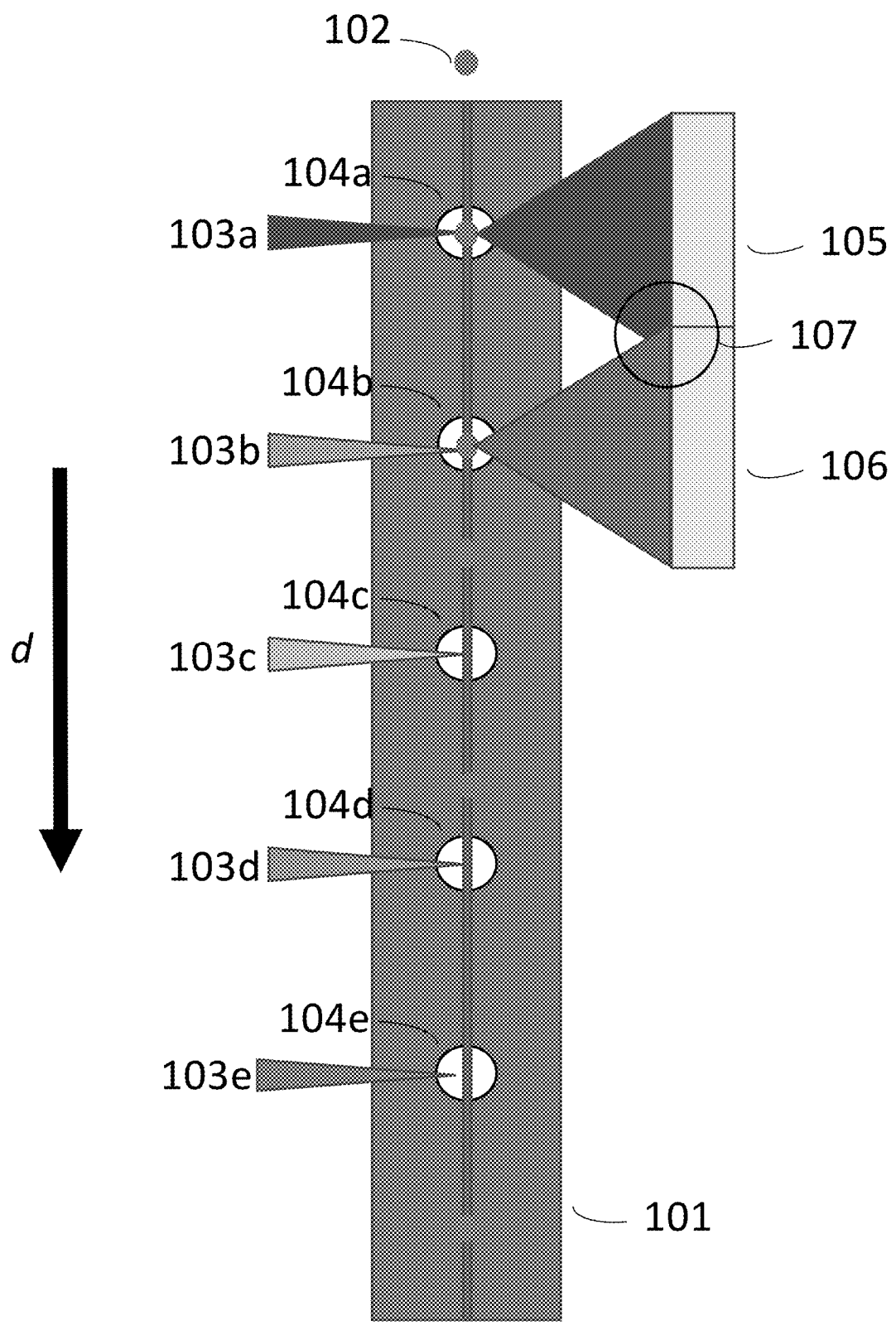

FIG. 1A-B contrasts a flow cytometric scenario that that does not involve crosstalk (FIG. 1A) with a flow cytometric scenario that does involve crosstalk (FIG. 1B). Particles 102 are flowing through flow cell 101 in direction d. In the scenario of FIG. 1A, five different lasers 103*a-e* irradiate the flow stream at interrogation zones 104*a-e*, respectively. A first particle is irradiated in interrogation zone 104*a* by laser 103*a*. Particle-modulated light resulting from the irradiation of the particle is collected by detector 105. However, there is no second particle in the irradiation zones of any of the other light sources (i.e., 103*b-e*). As such, the particle being irradiated in FIG. 1A is not associated with crosstalk or flow cytometer data having a coincident event. Conversely, FIG. 1B depicts a scenario that may result in a coincident event. As shown in FIG. 1B, a first particle is irradiated by laser 103*a* in interrogation zone 104*a* while a second particle is irradiated by laser 103*b* in interrogation zone 104*b*. Particle-modulated light resulting from the irradiation of the particle in irradiation zone 104*a* is collected by detector 105, while particle-modulated light resulting from the irradiation of the particle in interrogation zone 104*b* is collected by detector 106. However, crosstalk can be observed between the lasers. As shown in region 107, there is a slight overlap in the light detected by each of detectors 105 and 106. In other words, some of the light from interrogation zone 104*b* is collected by detector 105 and some of the light from interrogation zone 104*a* is collected by detector 106. Therefore, flow cytometer data collected in this scenario by detectors 106 and 107 include a coincident event. The present invention predicts this scenario by generating a time interval for the first and second particles. It is also worth noting that the first and second particles are spaced such that they will also be irradiated by lasers 103*b* and 103*c* simultaneously, 103*c* and 103*d* simultaneously, and 103*d* and 103*e* simultaneously once they advance through the flow cell in direction d. Therefore, particle-modulated light received by detectors associated with these light sources (not shown) may also result in coincident events. Embodiments of the method consequently also involve predicting that two particles having a particular time interval will result in a coincident event at multiple locations.

Where evaluated flow cytometer data includes a coincident event (i.e., as determined above), embodiments of the method additionally may include modifying the evaluated flow cytometer data. In certain cases, modifying the evaluated flow cytometer data, when performed, includes disregarding the flow cytometer data comprising a coincident event. By "disregarding" the flow cytometer data, it is meant removing the affected flow cytometer data from the remainder of data collected from the experiment. In other embodiments, the method includes assigning a coincidence identifier to the flow cytometer data comprising a coincident event. In other words, the affected flow cytometer data is marked as potentially being compromised. Any convenient coincidence identifier may be employed. For example, where flow cytometer data is displayed to a user, affected flow cytometer may be displayed in a certain color that indicates to a user that the data includes a coincident event. In other cases, methods include providing a notification to the user regarding the presence and location of the affected data. An individual interpreting the flow cytometer data may subsequently make an informed assessment regarding the effect of these data on the overall quality of the data.

In some embodiments, methods include deactivating the second light source during the coincident event. In other words, the methods include predicting when a coincident event is likely to occur, and deactivating the second (i.e., non-primary) light source accordingly to prevent the flow cytometer data from being affected. Methods may additionally include reactivating the second light source when the time period during which a coincidence is likely has passed.

Figure 2:
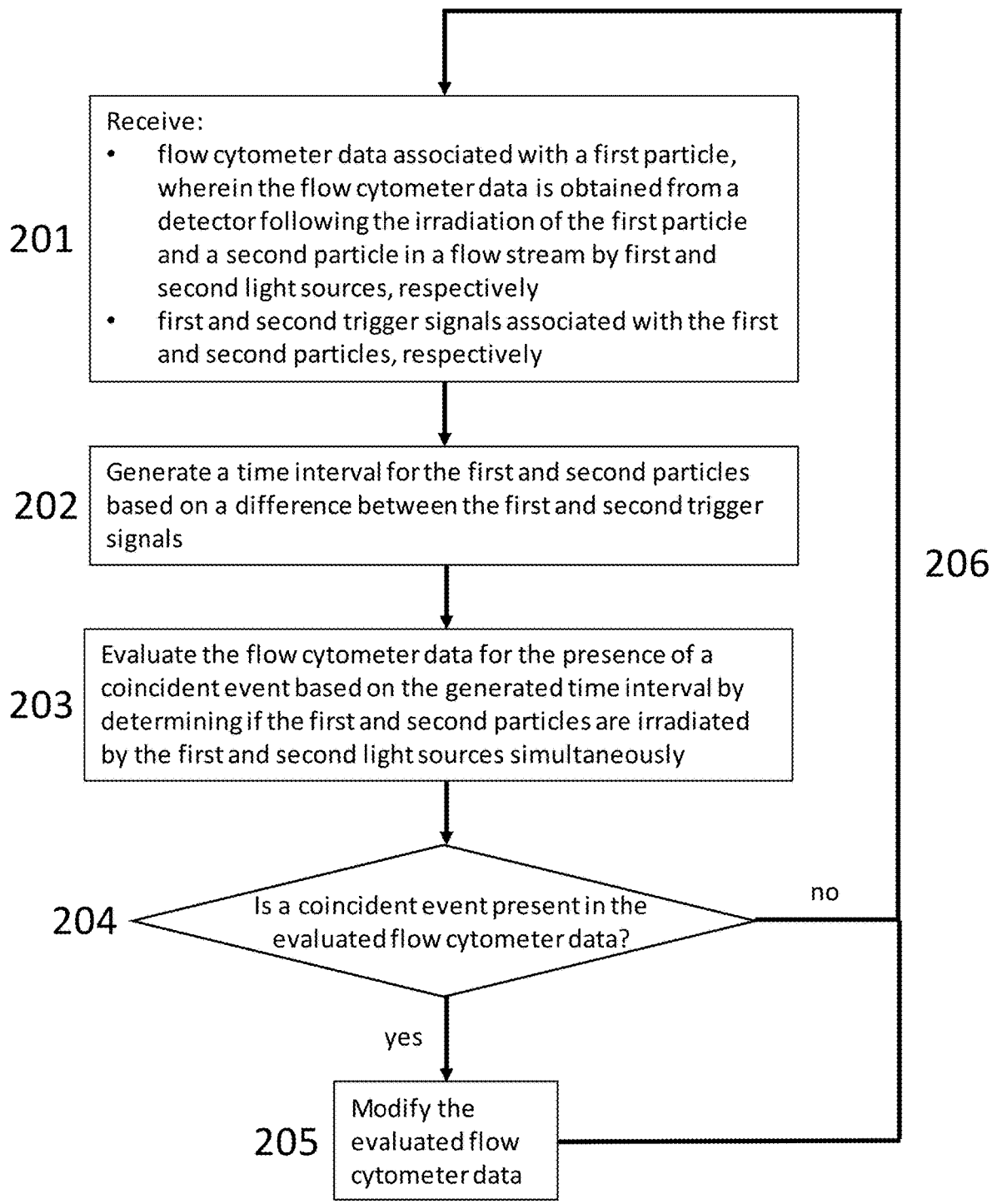
FIG. 2 presents a flowchart for evaluating flow cytometer data for the presence of a coincident event according to certain embodiments.

FIG. 2 presents a flowchart for evaluating flow cytometer data for the presence of a coincident event according to certain embodiments. Step 201 includes receiving flow cytometer data associated with a first particle as well as first and second trigger signals associated with first and second particles, respectively. Step 202 includes generating a time interval for the first and second particles based on a difference between the first and second trigger signals. Step 203 includes evaluating the flow cytometer data for the presence of a coincident event based on the generated time interval by determining if the first and second particles are irradiated by the first and second light sources simultaneously. In step 204, it is determined whether a coincident event is present in the flow cytometer data evaluated in step 203. If the evaluated flow cytometer data includes a coincident event, step 205 includes modifying the evaluated flow cytometer data (e.g., by disregarding it or assigning it a coincidence identifier). Subsequently, the method is repeated in step 206 with respect to a different pair of first and second particles. If the evaluated flow cytometer data does not include a coincident event, the method proceeds directly to step 206 without modifying the evaluated flow cytometer data.

Flow cytometer data evaluated in the present methods may be received from a previously-conducted experiment (e.g., from storage/memory) or received in real-time from a flow cytometric experiment. In other words, the period of time during which the flow cytometer data is obtained from a detector following the irradiation of the first particle and a second particle in a flow stream by first and second light sources may exist in the past or may alternatively be a part of an ongoing experiment. Where the flow cytometer data is received from a previously-conducted experiment, the period of time during which the flow cytometer data was obtained may range from, for example, 1 or more seconds in the past to 25 or more years in the past. For example, the period of time during which the flow cytometer data was obtained may be 1 second or more in the past, 5 seconds or more in the past, 10 seconds or more in the past, 1 minute or more in the past, 5, minutes or more in the past, 10 minutes or more in the past, 30 minutes or more in the past, 1 hour or more in the past, 5 hours or more in the past, 10 hours or more in the past, 1 day or more in the past, 3 days or more in the past, 1 week or more in the past, 3 weeks or more in the past, 1 month or more in the past, 3 months or more in the past, 6 months or more in the past, 1 year or more in the past, 3 years or more in the past, 6 years or more in the past, 15 years or more in the past, 20 years or more in the past or 25 or more years in the past. In some embodiments, flow cytometer data received from a previously-conducted experiment is stored on a memory device. Flow cytometer data from a previously-conducted experiment may be stored on memory may be any of a variety of known or future memory storage devices. Examples include any commonly available random access memory (RAM), magnetic medium such as a resident hard disk or tape, an optical medium such as a read and write compact disc, flash memory devices, cloud storage devices, or other memory storage device.

Where embodiments of the method include receiving flow cytometer data from an experiment in real time, aspects of the invention further include irradiating the first and second particles in a flow stream with first and second light sources, respectively. In practicing the subject methods, a sample having at least first and second particles (e.g., in a flow stream of a flow cytometer) is irradiated with light from at least first and second light sources. In some embodiments, at least one light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods include irradiating with at least one narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

Aspects of the present invention include collecting fluorescent light with a fluorescent light detector. A fluorescent light detector may, in some instances, be configured to detect fluorescence emissions from fluorescent molecules, e.g., labeled specific binding members (such as labeled antibodies that specifically bind to markers of interest) associated with the particle in the flow cell. In certain embodiments, methods include detecting fluorescence from the sample with one or more fluorescent light detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more fluorescent light detectors. In embodiments, each of the fluorescent light detectors is configured to generate a fluorescence data signal. Fluorescence from the sample may be detected by each fluorescent light detector, independently, over one or more of the wavelength ranges of 200 nm-1200 nm. In some instances, methods include detecting fluorescence from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include detecting fluorescence with each fluorescence detector at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different fluorescent light detectors in the subject light detection system. In certain embodiments, methods include detecting wavelengths of light which correspond to the fluorescence peak wavelength of certain fluorochromes present in the sample. In embodiments, fluorescent flow cytometer data is received from one or more fluorescent light detectors (e.g., one or more detection channels), such as 2 or more, such as 3 or more, such as 4 or more, such as 5 or more, such as 6 or more and including 8 or more fluorescent light detectors (e.g., 8 or more detection channels).

In certain cases, the sample analyzed is a particulate sample. In other words, the sample includes a plurality of particles (e.g., cells, beads, polynucleotides, proteins, etc.). In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for characterized according to a variety of parameters, such as a phenotypic characteristic identified via the attachment of a particular fluorescent label to cells of interest. In some embodiments, the system is configured to deflect analyzed droplets that are determined to include a target cell. A variety of cells may be characterized using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

Methods of interest may further include employing particles in research, laboratory testing, or therapy. In some embodiments, the subject methods include obtaining individual cells prepared from a target fluidic or tissue biological sample. For example, the subject methods include obtaining cells from fluidic or tissue samples to be used as a research or diagnostic specimen for diseases such as cancer. Likewise, the subject methods include obtaining cells from fluidic or tissue samples to be used in therapy. A cell therapy protocol is a protocol in which viable cellular material including, e.g., cells and tissues, may be prepared and introduced into a subject as a therapeutic treatment. Conditions that may be treated by the administration of the flow cytometrically sorted sample include, but are not limited to, blood disorders, immune system disorders, organ damage, etc.

A typical cell therapy protocol may include the following steps: sample collection, cell isolation, genetic modification, culture, and expansion in vitro, cell harvesting, sample volume reduction and washing, bio-preservation, storage, and introduction of cells into a subject. The protocol may begin with the collection of viable cells and tissues from source tissues of a subject to produce a sample of cells and/or tissues. The sample may be collected via any suitable procedure that includes, e.g., administering a cell mobilizing agent to a subject, drawing blood from a subject, removing bone marrow from a subject, etc. After collecting the sample, cell enrichment may occur via several methods including, e.g., centrifugation based methods, filter based methods, elutriation, magnetic separation methods, fluorescence-activated cell sorting (FACS), and the like. In some cases, the enriched cells may be genetically modified by any convenient method, e.g., nuclease mediated gene editing. The genetically modified cells can be cultured, activated, and expanded in vitro. In some cases, the cells are preserved, e.g., cryopreserved, and stored for future use where the cells are thawed and then administered to a patient, e.g., the cells may be infused in the patient.

Systems for Evaluating Flow Cytometer Data

Aspects of the invention additionally include systems (e.g., flow cytometers) for evaluating flow cytometer data. Systems of interest include a flow cell configured to transport a particulate sample in a flow stream, first and second light sources configured to irradiate first and second particles in the particulate sample, respectively, a detector configured to produce flow cytometer data associated with the first particle, and a processor configured to evaluate flow cytometer data. Processors of interest are configured to receive flow cytometer data associated with the irradiated first particle from the detector, as well as first and second trigger signals associated with the first and second particles, respectively. In addition, the subject processors generate a time interval for the first and second particles based on a difference between the first and second trigger signals, and evaluate the obtained flow cytometer data for the presence of a coincident event based on the generated time interval by determining if the first and second particles are irradiated by the first and second light sources simultaneously.

As discussed herein, a "flow cell" is described in its conventional sense to refer to a component, such as a cuvette, containing a flow channel having a liquid flow stream for transporting particles in a sheath fluid. Cuvettes of interest include containers having a passage running therethrough. The flow stream may include a liquid sample injected from a sample tube. Flow cells of interest include a light-accessible flow channel. In some instances, the flow cell includes transparent material (e.g., quartz) that permits the passage of light therethrough. In some embodiments, the flow cell is a stream-in-air flow cell in which light interrogation of the particles occurs in free space. In some cases, the flow stream is configured for irradiation with light from the first and second light sources at interrogation zones (e.g., such as those described above). The flow stream for which the flow channel is configured may include a liquid sample injected from a sample tube. In certain embodiments, the flow stream may include a narrow, rapidly flowing stream of liquid that is arranged such that linearly segregated particles transported therein are separated from each other in a single-file manner. After particles are irradiated in the flow cell, particle-modulated light may be observed. By "particle-modulated light" it is meant light that is received from the particles in the flow stream following the irradiation of the particles with light from the light source. In some cases, the particle-modulated light is side-scattered light. As discussed herein, side-scattered light refers to light refracted and reflected from the surfaces and internal structures of the particle. In additional embodiments, the particle-modulated light includes forward-scattered light (i.e., light that travels through or around the particle in mostly a forward direction). In still other cases, the particle-modulated light includes fluorescent light (i.e., light emitted from a fluorochrome following irradiation with excitation wavelength light).

In some cases, the subject processors are operated in conjunction with programmable logic that may be implemented in hardware, software, firmware, or any combination thereof in order to, e.g., evaluate flow cytometer data for the presence of coincident events. For example, where programmable logic is implemented in software, evaluating flow cytometer data for coincident events may be realized at least in part by a computer-readable data storage medium comprising program code including instructions that, when executed, is configured to receive flow cytometer data associated with the irradiated first particle from the detector, as well as first and second trigger signals associated with the first and second particles, respectively. The program code may additionally include instructions for generating a time interval for the first and second particles based on a difference between the first and second trigger signals. For example, where $t_1$ is the time point associated with the first trigger signal and $t_2$ the time point associated with the second trigger signal, the time interval may be calculated by finding $|t_2-t_1|$. In some cases, the time interval indicates an amount of time elapsing between the time point at which the first particle is detected in the flow stream (i.e., the first trigger signal) and the time point at which the second particle is detected in the flow stream (i.e., the second trigger signal). The program code may further include instructions for evaluating the obtained flow cytometer data for the presence of a coincident event based on the generated time interval by determining if the first and second particles are irradiated by the first and second light sources simultaneously. In some cases, evaluating the flow cytometer data comprises comparing the time interval to a measurement window associated with the second light source, such as by determining based on the time interval if the second particle falls within the measurement window associated with the second light source while flow cytometer data associated with the first particle is obtained from the detector. In other cases, evaluating the flow cytometer data comprises comparing the time interval to a standard value, such as by determining if the time interval is lower than the standard value.

Where coincident events are identified by the programmable logic, the subject processor may additionally be configured to modify the affected flow cytometer data. In certain cases, modifying the evaluated flow cytometer data includes disregarding the flow cytometer data comprising a coincident event (i.e., removing the affected flow cytometer data from the remainder of data collected from the experiment). In other embodiments, the method includes assigning a coincidence identifier to the flow cytometer data comprising a coincident event. In other words, the affected flow cytometer data is marked as potentially being compromised. An individual interpreting the flow cytometer data may subsequently make an informed assessment regarding the effect of these data on the quality of the data.

The subject programmable logic may be implemented in any of a variety of devices such as specifically programmed event processing computers, wireless communication devices, integrated circuit devices, or the like. In some embodiments, the programable logic may be executed by a specifically programmed processor, which may include one or more processors, such as one or more digital signal processors (DSPs), configurable microprocessors, application specific integrated circuits (ASICs), field programmable gate arrays (FPGAs), or other equivalent integrated or discrete logic circuitry. A combination of computing devices, e.g., a combination of a DSP and a microprocessor, a plurality of microprocessors, one or more microprocessors in conjunction with a DSP core, or any other such configuration in at least partial data connectivity may implement one or more of the features described herein.

In certain cases, systems further include a display configured to output the flow cytometer data evaluated by the processor. A user may subsequently view the flow cytometer data evaluated by the processor. The subject display may include, but is not limited to, a monitor, a tablet computer, a smartphone, or other electronic device configured to present graphical interfaces.

As discussed above, aspects of the invention also include first and second light sources configured to irradiate particles passing through the flow cell at an interrogation point. Any convenient light source may be employed as the first and second light sources described herein. In some embodiments, one or more light sources is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light sources may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

As discussed above, particle analyzers of interest may further include one or more detectors for detecting particle-modulated light intensity data. In some embodiments, the particle-modulated light detector(s) include one or more forward-scattered light detectors configured to detect forward-scattered light. For example, the subject particle analyzers may include 1 forward-scattered light detector or multiple forward-scattered light detectors, such as 2 or more, such as 3 or more, such as 4 or more, and including 5 or more. In certain embodiments, particle analyzers include 1 forward-scattered light detector. In other embodiments, particle analyzers include 2 forward-scattered light detectors.

Any convenient detector for detecting collected light may be used in the forward-scattered light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from 0.1 cm$^2$ to 8 cm$^2$, such as from 0.5 cm$^2$ to 7 cm$^2$ and including from 1 cm$^2$ to 5 cm$^2$.

In embodiments, the forward-scattered light detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In additional embodiments, the one or more detector(s) may include one or more side-scattered light detectors for detecting side-scatter wavelengths of light (i.e., light refracted and reflected from the surfaces and internal structures of the particle). In some embodiments, particle analyzers include a single side-scattered light detector. In other embodiments, particle analyzers include multiple side-scattered light detectors, such as 2 or more, such as 3 or more, such as 4 or more, and including 5 or more.

Any convenient detector for detecting collected light may be used in the side-scattered light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from 0.1 $cm^2$ to 8 $cm^2$, such as from 0.5 $cm^2$ to 7 $cm^2$ and including from 1 $cm^2$ to 5 $cm^2$.

In embodiments, the subject particle analyzers also include a fluorescent light detector configured to detect one or more fluorescent wavelengths of light. In other embodiments, particle analyzers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple fluorescent light detectors, each fluorescent light detector may be the same, or the collection of fluorescent light detectors may be a combination of different types of detectors. For example, where the subject particle analyzers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in the particle analyzers as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, particle analyzers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, particle analyzers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

In certain embodiments, one or more detectors may be configured to be paired with specific fluorophores, such as those used with the sample in a fluorescence assay.

In some embodiments, one or more of the particle-modulated light detectors includes one or more detector arrays, such as an array of photodiodes. In these embodiments, each detector array may include 4 or more detectors, such as 10 or more detectors, such as 25 or more detectors, such as 50 or more detectors, such as 100 or more detectors, such as 250 or more detectors, such as 500 or more detectors, such as 750 or more detectors and including 1000 or more detectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The detectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The detectors in the detector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The detector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the detector array has a rectangular-shaped active surface.

In some embodiments, particle analyzers include one or more wavelength separators positioned between the flow cell and the particle-modulated light detector(s). The term "wavelength separator" is used herein in its conventional sense to refer to an optical component that is configured to separate light collected from the sample into predetermined spectral ranges. In some embodiments, particle analyzers include a single wavelength separator. In other embodiments, particle analyzers include a plurality of wavelength separators, such as 2 or more wavelength separators, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more wavelength separators. In some embodiments, the wavelength separator is configured to separate light collected from the sample into predetermined spectral ranges by passing light having a predetermined spectral range and reflecting one or more remaining spectral ranges of light. In other embodiments, the wavelength separator is configured to separate light collected from the sample into predetermined spectral ranges by passing light having a predetermined spectral range and absorbing one or more remaining spectral ranges of light. In yet other embodiments, the wavelength separator is configured to spatially diffract light collected from the sample into predetermined spectral ranges. Each wavelength separator may be any convenient light separation protocol, such as one or more dichroic mirrors, bandpass filters, diffraction gratings, beam splitters or prisms. In some embodiments, the wavelength separator is a prism. In other embodiments, the wavelength separator is a diffraction grating. In certain embodiments, wavelength separators in the subject light detection systems are dichroic mirrors.

As discussed above, aspects of the subject flow cytometers include a flow cell configured to propagate particles in a flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell includes a sample injection port configured to provide a sample to the flow cell. The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, such as 0.2 to 3.0 mm, such as 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-sectional shape of the sample injection tube. For example, the orifice of the sample injection port may include a beveled tip having a bevel angle ranging from 1 degree to 10 degrees, such as from 2 degrees to 9 degrees, such as from 3 degrees to 8 degrees, such as from 4 degrees to 7 degrees and including a bevel angle of 5 degrees.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec to 2500 µL/sec, such as 50 µL/sec to 1000 µL/sec, and including 75 µL/sec or more to 750 µL/sec.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including from 10 nL/min to 50 nL/min. In certain embodiments, the flow rate of the flow stream is from 5 nL/min to 6 nL/min.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5): 502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 3:
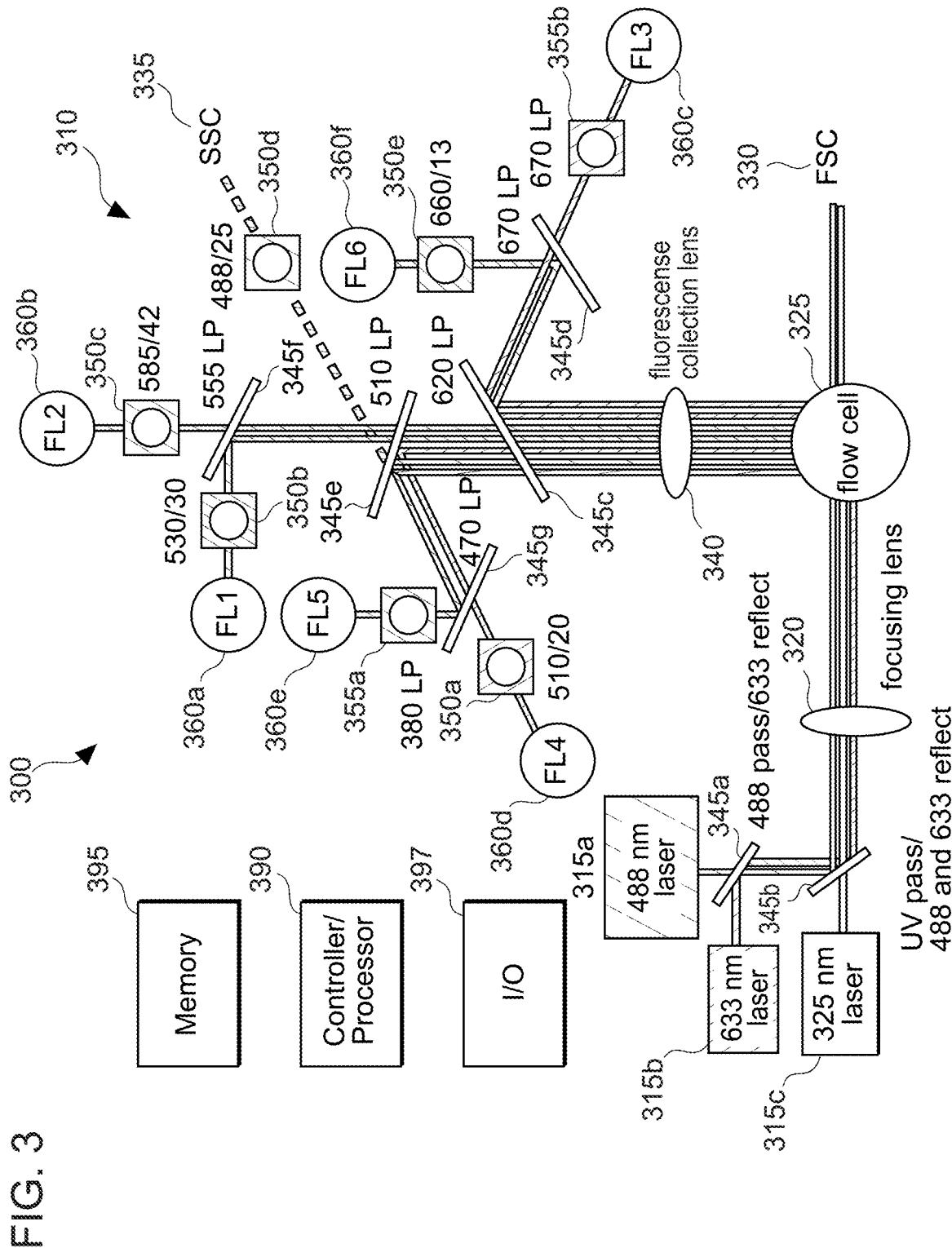
FIG. 3 depicts a functional block diagram of a flow cytometric system according to certain embodiments.

FIG. 3 shows a system 300 for flow cytometry in accordance with an illustrative embodiment of the present invention. The system 300 includes a flow cytometer 310, a controller/processor 390 and a memory 395. The flow cytometer 310 includes one or more excitation lasers 315a-315c, a focusing lens 320, a flow chamber 325, a forward-scatter detector 330, a side-scatter detector 335, a fluorescence collection lens 340, one or more beam splitters 345a-345g, one or more bandpass filters 350a-350e, one or more longpass ("LP") filters 355a-355b, and one or more fluorescent detectors 360a-360f.

The excitation lasers 315a-c emit light in the form of a laser beam. The wavelengths of the laser beams emitted from excitation lasers 315a-315c are 488 nm, 633 nm, and 325 nm, respectively, in the example system of FIG. 3. The laser beams are first directed through one or more of beam splitters 345a and 345b. Beam splitter 345a transmits light at 488 nm and reflects light at 633 nm. Beam splitter 345b transmits UV light (light with a wavelength in the range of 10 to 400 nm) and reflects light at 488 nm and 633 nm.

The laser beams are then directed to a focusing lens 320, which focuses the beams onto the portion of a fluid stream where particles of a sample are located, within the flow chamber 325. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward-scatter detector 330, the side-scatter detector 335, and the one or more fluorescent detectors 360a-360f through one or more of the beam splitters 345c-345g, the bandpass filters 350a-350e, the longpass filters 355a-355b, and the fluorescence collection lens 340.

The fluorescence collection lens 340 collects light emitted from the particle-laser beam interaction and routes that light towards one or more beam splitters and filters. Bandpass filters, such as bandpass filters 350a-350e, allow a narrow range of wavelengths to pass through the filter. For example, bandpass filter 350a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 355a-355b, transmit wavelengths of light equal to or longer than a specified wavelength of light. For example, longpass filter 355b, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

The forward-scatter detector 330 is positioned slightly off axis from the direct beam through the flow cell and is configured to detect diffracted light, the excitation light that travels through or around the particle in mostly a forward direction. The intensity of the light detected by the forward-scatter detector is dependent on the overall size of the particle. The forward-scatter detector can include a photodiode. The side-scatter detector 335 is configured to detect refracted and reflected light from the surfaces and internal structures of the particle that tends to increase with increasing particle complexity of structure. The fluorescence emissions from fluorescent molecules associated with the particle can be detected by the one or more fluorescent detectors 360a-360f. The side-scatter detector 335 and fluorescent detectors can include photomultiplier tubes. The signals detected at the forward-scatter detector 330, the side-scatter detector 335 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 3, but can include any flow cytometer known in the art. For example, a flow cytometer may have any number of lasers, beam splitters, filters, and detectors at various wavelengths and in various different configurations.

In operation, cytometer operation is controlled by a controller/processor 390, and the measurement data from the detectors can be stored in the memory 395 and processed by the controller/processor 390. Although not shown explicitly, the controller/processor 390 is coupled to the detectors to receive the output signals therefrom, and may also be coupled to electrical and electromechanical components of the flow cytometer 310 to control the lasers, fluid flow parameters, and the like. Input/output (I/O) capabilities 397 may be provided also in the system. The memory 395, controller/processor 390, and I/O 397 may be entirely provided as an integral part of the flow cytometer 310. In such an embodiment, a display may also form part of the I/O capabilities 397 for presenting experimental data to users of the cytometer 310. Alternatively, some or all of the memory 395 and controller/processor 390 and I/O capabilities may be part of one or more external devices such as a general purpose computer. In some embodiments, some or all of the memory 395 and controller/processor 390 can be in wireless or wired communication with the cytometer 310. The controller/processor 390 in conjunction with the memory 395 and the I/O 397 can be configured to perform various functions related to the preparation and analysis of a flow cytometer experiment.

The system illustrated in FIG. 3 includes six different detectors that detect fluorescent light in six different wavelength bands (which may be referred to herein as a "filter window" for a given detector) as defined by the configuration of filters and/or splitters in the beam path from the flow cell 325 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. The I/O 397 can be configured to receive data regarding a flow cytometer experiment having a panel of fluorescent labels and a plurality of cell populations having a plurality of markers, each cell population having a subset of the plurality of markers. The I/O 397 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 395. The controller/processor 390 can be configured to evaluate one or more assignments of labels to markers.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflection plates, such as described in U.S. Patent Publication No. 2017/0299493, filed on Mar. 28, 2017, the disclosure of which is incorporated herein by reference.

Figure 4:
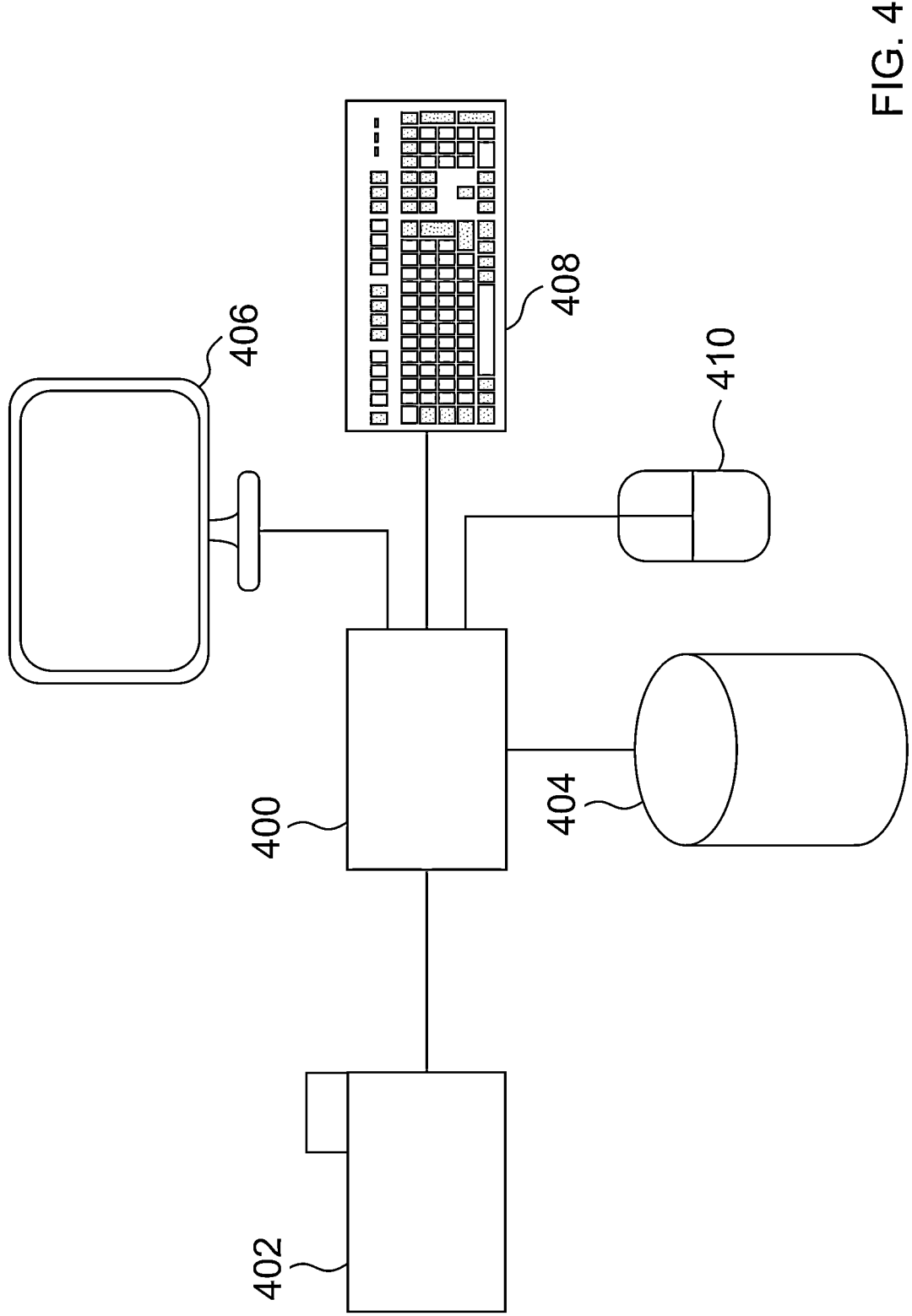
FIG. 4 depicts a control system according to certain embodiments.

FIG. 4 shows a functional block diagram for one example of a system, such as a processor 400, for analyzing and displaying biological events. A processor 400 can be configured to implement a variety of processes for controlling graphic display of biological events.

A flow cytometer or sorting system 402 can be configured to acquire biological event data. For example, a flow cytometer can generate flow cytometric event data (e.g., particle-modulated light data). The flow cytometer 402 can be configured to provide biological event data to the processor 400. A data communication channel can be included between the flow cytometer 402 and the processor 400. The biological event data can be provided to the processor 400 via the data communication channel. The processor 400 can be configured to receive biological event data from the flow cytometer 402. The biological event data received from the flow cytometer 402 can include flow cytometric event data. The processor 400 is configured to evaluate the data received from the flow cytometer 402, e.g., as discussed above. For example, the processor 400 is configured to receive flow cytometer data associated with an irradiated first particle from the detector, as well as first and second trigger signals associated with the first and second particles, respectively. In addition, the processor 400 is configured to generate a time interval for the first and second particles based on a difference between the first and second trigger signals, and evaluate the obtained flow cytometer data for the presence of a coincident event based on the generated time interval by determining if the first and second particles are irradiated by the first and second light sources simultaneously.

The processor 400 can be configured to provide a graphical display including a biological event data to a display device 406. In certain cases, the processor 400 excludes flow cytometer data having coincident events from being displayed on the graphical display (i.e., the affected flow cytometer data is disregarded). In other cases, the processor 400 assigns the affected flow cytometer data a coincidence identifier. For example, the affected flow cytometer data may be marked a particular color on the graphical display, or a notification is present drawing a user's attention to the affected data. The processor 400 can be further configured to render a region of interest as a gate around a population of biological event data shown by the display device 406, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The processor 400 can be further configured to display the biological event data on the display device 406 within the gate differently from other events in the biological event data outside of the gate. For example, the processor 400 can be configured to render the color of biological event data contained within the gate to be distinct from the color of biological event data outside of the gate. The display device 406 can be implemented as a monitor, a tablet computer, a smartphone, or other electronic device configured to present graphical interfaces.

The processor 400 can be configured to receive a gate selection signal identifying the gate from a first input device. For example, the first input device can be implemented as a mouse 410. The mouse 410 can initiate a gate selection signal to the processor 400 identifying the gate to be displayed on or manipulated via the display device 406 (e.g., by clicking on or in the desired gate when the cursor is positioned there). In some implementations, the first device can be implemented as the keyboard 408 or other means for providing an input signal to the processor 400 such as a touchscreen, a stylus, an optical detector, or a voice recognition system. Some input devices can include multiple inputting functions. In such implementations, the inputting functions can each be considered an input device. For example, as shown in FIG. 4, the mouse 410 can include a right mouse button and a left mouse button, each of which can generate a triggering event.

The triggering event can cause the processor 400 to alter the manner in which the data is displayed, which portions of the data is actually displayed on the display device 406, and/or provide input to further processing such as selection of a population of interest for particle sorting.

In some embodiments, the processor 400 can be configured to detect when gate selection is initiated by the mouse 410. The processor 400 can be further configured to automatically modify plot visualization to facilitate the gating process. The modification can be based on the specific distribution of biological event data received by the processor 400. In some embodiments, the processor 400 expands the first gate such that a second gate is generated (e.g., as discussed above).

The processor 400 can be connected to a storage device 404. The storage device 404 can be configured to receive and store biological event data from the processor 400. The storage device 404 can also be configured to receive and store flow cytometric event data from the processor 400. The storage device 404 can be further configured to allow retrieval of biological event data, such as flow cytometric event data, by the processor 400.

The display device 406 can be configured to receive display data from the processor 400. The display data can comprise plots of biological event data and gates outlining sections of the plots. The display device 406 can be further configured to alter the information presented according to input received from the processor 400 in conjunction with input from the flow cytometer 402, the storage device 404, the keyboard 408, and/or the mouse 410.

In some implementations the processor 400 can generate a user interface to receive example events for sorting. For example, the user interface can include a mechanism for receiving example events or example images. The example events or images or an example gate can be provided prior to collection of event data for a sample or based on an initial set of events for a portion of the sample.

Figure 5A:
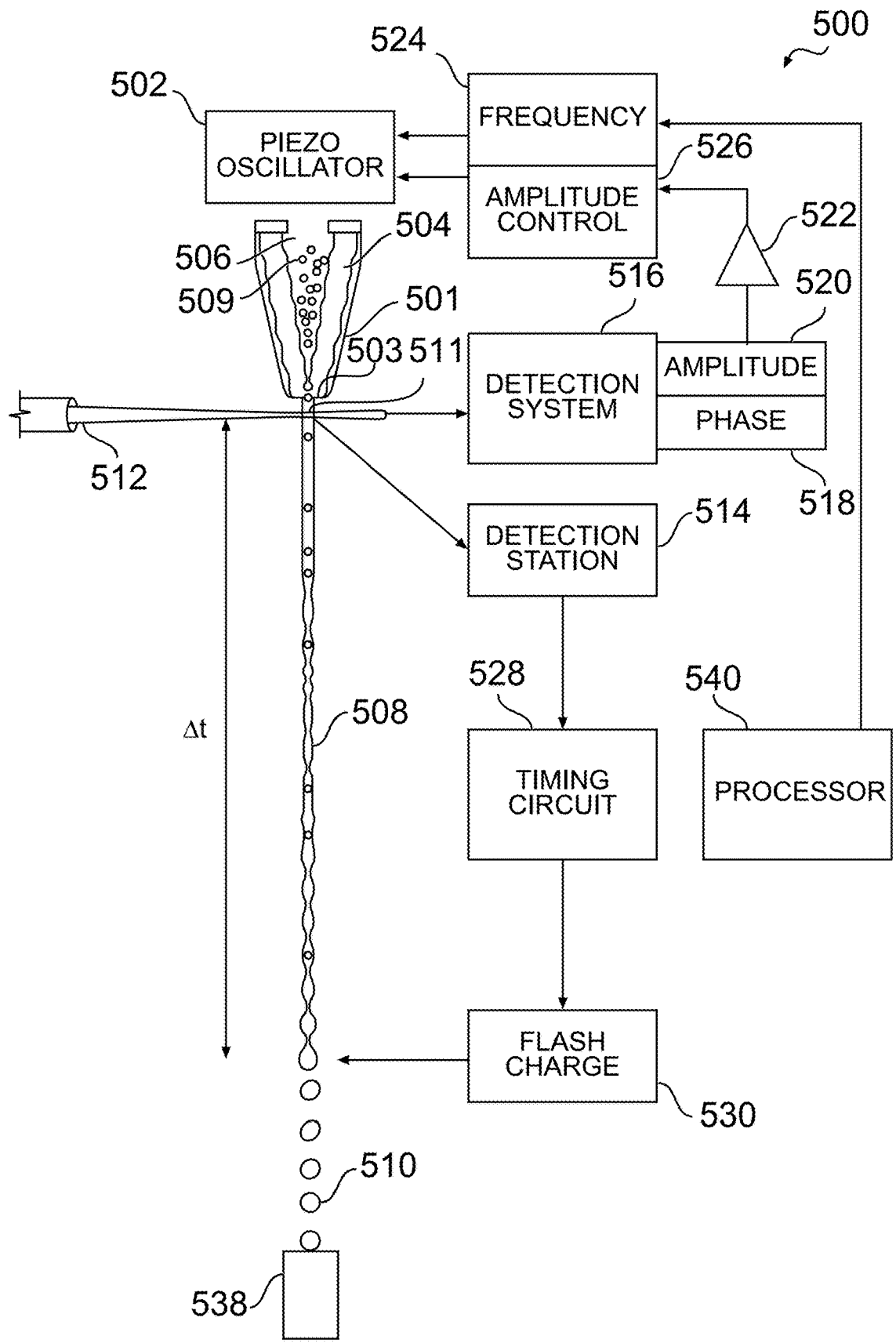
FIG. 5A-B depict a schematic drawing of a particle sorter system according to certain embodiments.

FIG. 5A is a schematic drawing of a particle sorter system 500 (e.g., the flow cytometer 402) in accordance with one embodiment presented herein. In some embodiments, the particle sorter system 500 is a cell sorter system. As shown in FIG. 5A, a drop formation transducer 502 (e.g., piezo-oscillator) is coupled to a fluid conduit 501, which can be coupled to, can include, or can be, a nozzle 503. Within the fluid conduit 501, sheath fluid 504 hydrodynamically focuses a sample fluid 506 comprising particles 509 into a moving fluid column 508 (e.g., a stream). Within the moving fluid column 508, particles 509 (e.g., cells) are lined up in single file to cross a monitored area 511 (e.g., where laser-stream intersect), irradiated by an irradiation source 512 (e.g., a laser). Vibration of the drop formation transducer 502 causes moving fluid column 508 to break into a plurality of drops 510, some of which contain particles 509.

In operation, a detection station 514 (e.g., an event detector) identifies when a particle of interest (or cell of interest) crosses the monitored area 511. Detection station 514 feeds into a timing circuit 528, which in turn feeds into a flash charge circuit 530. At a drop break off point, informed by a timed drop delay ($\Delta t$), a flash charge can be applied to the moving fluid column 508 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 5A, the drops can be collected in a drain receptacle 538.

A detection system 516 (e.g., a drop boundary detector) serves to automatically determine the phase of a drop drive signal when a particle of interest passes the monitored area 511. An exemplary drop boundary detector is described in U.S. Pat. No. 7,679,039, which is incorporated herein by reference in its entirety. The detection system 516 allows the instrument to accurately calculate the place of each detected particle in a drop. The detection system 516 can feed into an amplitude signal 520 and/or phase 518 signal, which in turn feeds (via amplifier 522) into an amplitude control circuit 526 and/or frequency control circuit 524. The amplitude control circuit 526 and/or frequency control circuit 524, in turn, controls the drop formation transducer 502. The amplitude control circuit 526 and/or frequency control circuit 524 can be included in a control system.

In some implementations, sort electronics (e.g., the detection system 516, the detection station 514 and a processor 540) can be coupled with a memory configured to store the detected events and a sort decision based thereon. The sort decision can be included in the event data for a particle. In some implementations, the detection system 516 and the detection station 514 can be implemented as a single detection unit or communicatively coupled such that an event measurement can be collected by one of the detection system 516 or the detection station 514 and provided to the non-collecting element.

Figure 5B:
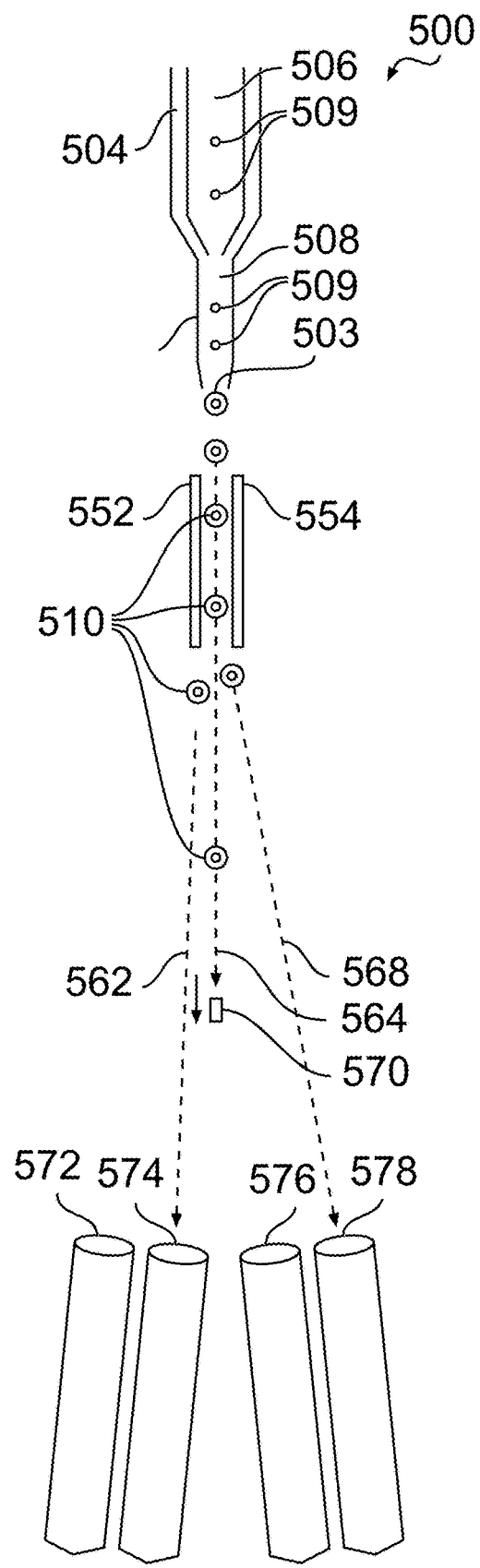

FIG. 5B is a schematic drawing of a particle sorter system, in accordance with one embodiment presented herein. The particle sorter system 500 shown in FIG. 5B, includes deflection plates 552 and 554. A charge can be applied via a stream-charging wire in a barb. This creates a stream of droplets 510 containing particles 509 for analysis. The particles can be illuminated with one or more light sources (e.g., lasers) to generate light scatter and fluorescence information. The information for a particle is analyzed such as by sorting electronics or other detection system (not shown in FIG. 5B). The deflection plates 552 and 554 can be independently controlled to attract or repel the charged droplet to guide the droplet toward a destination collection vessel (e.g., one of 572, 574, 576, or 578). As shown in FIG. 5B, the deflection plates 552 and 554 can be controlled to direct a particle along a first path 562 toward the vessel 574 or along a second path 568 toward the vessel 578. If the particle is not of interest (e.g., does not exhibit scatter or illumination information within a specified sort range), deflection plates may allow the particle to continue along a flow path 564. Such uncharged droplets may pass into a waste receptacle such as via aspirator 570.

The sorting electronics can be included to initiate collection of measurements, receive fluorescence signals for particles, and determine how to adjust the deflection plates to cause sorting of the particles. Example implementations of the embodiment shown in FIG. 5B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems include one or more computers for complete automation or partial automation. In some embodiments, systems include a computer having a non-transitory computer readable storage medium with a computer program stored thereon, where the computer program when loaded on the computer includes instructions for receiving flow cytometer data associated with a first particle as well as first and second trigger signals associated with the first and second particles, respectively. Computer programs of interest additionally include instructions for generating a time interval for the first and second particles based on a difference between the first and second trigger signals, and evaluating the flow cytometer data for the presence of a coincident event based on the generated time interval by determining if the first and second particles are irradiated by the first and second light sources simultaneously.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400®, i5/OS®, IBM i®, Android™, SGI IRIX®, Oracle Solaris® and others.

Figure 6:
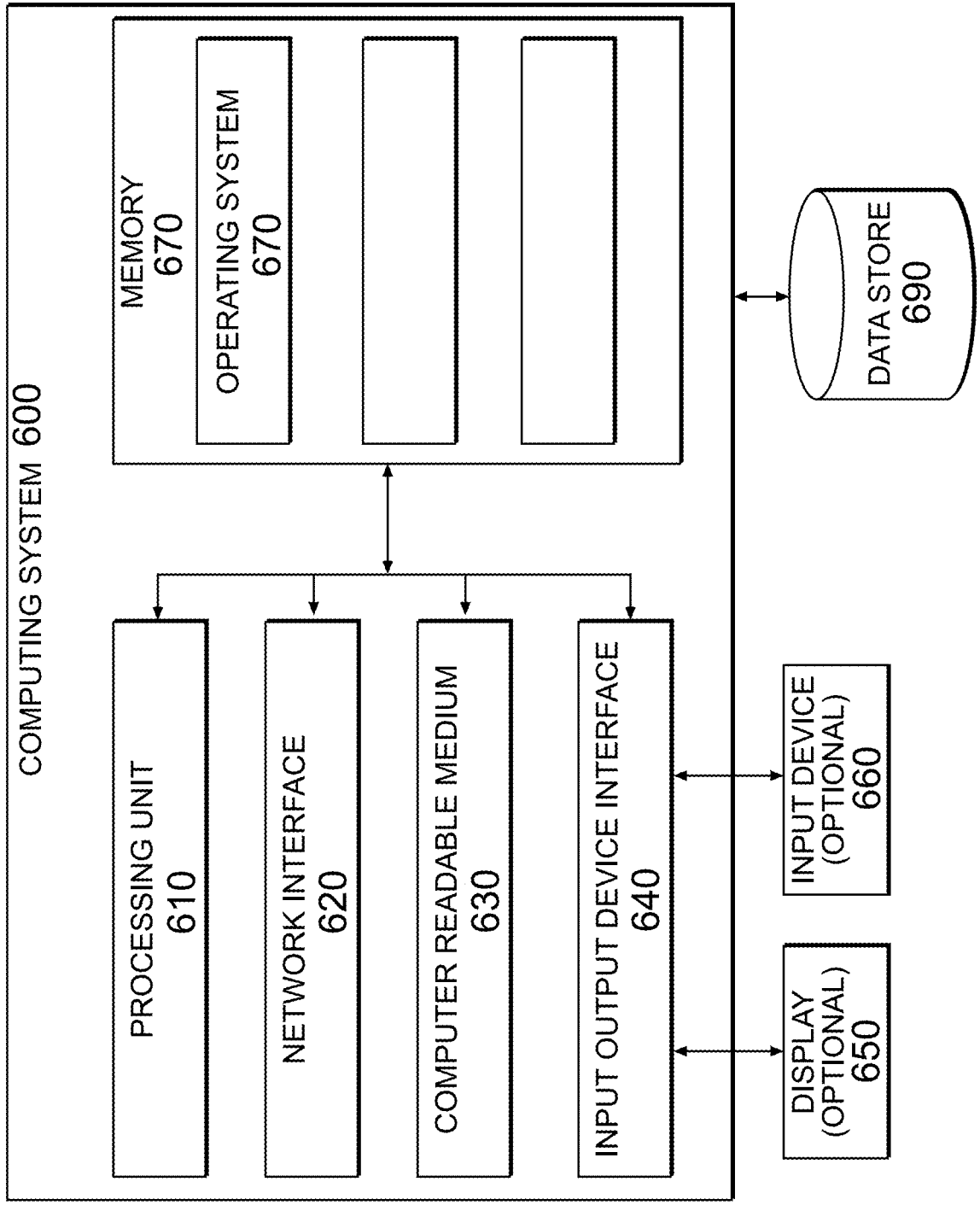
FIG. 6 depicts a block diagram of a computing system according to certain embodiments.

FIG. 6 depicts a general architecture of an example computing device 600 according to certain embodiments. The general architecture of the computing device 600 depicted in FIG. 6 includes an arrangement of computer hardware and software components. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. For example, an analysis software (e.g., data analysis software or program such as FlowJo®) stored as executable instructions in the non-transitory memory of the analysis system can display the flow cytometry event data to a user. The input/output device interface 640 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. Data may be stored in data storage device 690. The memory 670 may further include computer program instructions and other information for implementing aspects of the present disclosure.

Utility

The subject methods, system and computer systems find use in a variety of applications where it is desirable to analyze and, optionally, sort particle components in a sample in a fluid medium, such as a biological sample, and then store sorted products, e.g., for later use, such as therapeutic use. The present invention particularly finds use where it is desirable to evaluate flow cytometer data for the presence of coincident events. As the speed with which flow cytometers collect data is increasing, the occurrence of coincident events becomes more likely. As such, the present invention finds use in situations where it is desirable to increase analysis speed while maintaining data integrity. In addition, the subject methods, systems and computer systems may be employed where it is desirable to include more colors in flow cytometric protocols. Because the trend towards the inclusion of more colors stresses existing systems to the degree that the noise created by this crosstalk can decrease the fidelity of the resulting data and potentially create confounding artifacts, the present invention may be employed to identify and mitigate the effects of crosstalk thereby increasing the feasibility of protocols including increased numbers of colors.

Embodiments of the invention find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Kits

Aspects of the present disclosure further include kits, where kits include storage media such as a magneto-optical disk, CD-ROM, CD-R magnetic tape, non-volatile memory card, ROM, DVD-ROM, Blue-ray disk, solid state disk, and network attached storage (NAS). Any of these program storage media, or others now in use or that may later be developed, may be included in the subject kits. In embodiments, the program storage media include instructions for evaluating flow cytometer data for the presence of coincident events. In embodiments, the instructions contained on computer readable media provided in the subject kits, or a portion thereof, can be implemented as software components of a software for analyzing data. In these embodiments, computer-controlled systems according to the instant disclosure may function as a software "plugin" for an existing software package.

In addition to the above components, the subject kits may further include (in some embodiments) instructions, e.g., for installing a plugin to the existing software package. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of evaluating flow cytometer data for the presence of a coincident event, the method comprising:
   irradiating first and second particles in a flow stream with first and second light sources, respectively;
   receiving:
   flow cytometer data associated with the first particle, wherein the flow cytometer data is obtained from a detector following the irradiation of the first particle and the second particle in the flow stream by the first and second light sources, respectively; and
   first and second trigger signals associated with the first and second particles, respectively;
   generating a time interval for the first and second particles based on a difference between the first and second trigger signals; and
   evaluating the flow cytometer data for the presence of a coincident event based on the generated time interval by determining if the first and second particles are irradiated by the first and second light sources simultaneously.

2. The method according to claim 1, wherein evaluating the flow cytometer data comprises comparing the time interval to a measurement window associated with the second light source.

3. The method according to claim 2, wherein the measurement window defines a period of time during which the irradiation of the second particle produces a coincident event.

4. The method according to claim 2, wherein evaluating the flow cytometer data comprises determining based on the time interval if the second particle falls within the measurement window of the second light source while flow cytometer data associated with the first particle is obtained from the detector.

5. The method according to claim 1, wherein evaluating the flow cytometer data comprises comparing the time interval to a standard value.

6. The method according to claim 5, wherein evaluating the flow cytometer data comprises determining if the time interval is lower than the standard value.

7. The method according to claim 1, further comprising assigning a coincidence identifier to the flow cytometer data comprising a coincident event.

8. The method according to claim 1, further comprising disregarding the flow cytometer data comprising a coincident event.

9. The method according to claim 1, wherein the first and second trigger signals indicate time points at which the first and second particles are detected in the flow stream, respectively.

10. The method according to claim 1, further comprising estimating relative positions of the first and second particles within the flow stream based on the generated time interval.

11. The method according to claim 1, further comprising evaluating flow cytometer data associated with a plurality of different pairs of first and second particles from within a particulate sample.

12. The method according to claim 1, wherein the first and second particles are consecutive particles within the flow stream.

13. The method according to claim 1, wherein the first and second particles are non-consecutive particles within the flow stream.

14. The method according to claim 1, further comprising:
predicting when a coincident event is likely to occur; and
deactivating the second light source during the predicted coincident event.

15. The method according to claim 1, wherein the first and second light sources are selected from a plurality of light sources.

16. The method according to claim 15, wherein the number of light sources in the plurality of light sources ranges from 2 to 10.

17. The method according to claim 15, wherein the plurality of light sources comprises one or more lasers.

18. The method according to claim 1, wherein the detector is selected from a plurality of detectors.

19. The method according to claim 18, wherein the number of detectors in the plurality of detectors ranges from 2 to 10.

* * * * *